R. HAMLEN.
SAFETY SWITCH FOR ELECTRIC TRAIN CONTROLS.
APPLICATION FILED MAR. 31, 1914.
1,138,287.
Patented May 4, 1915.
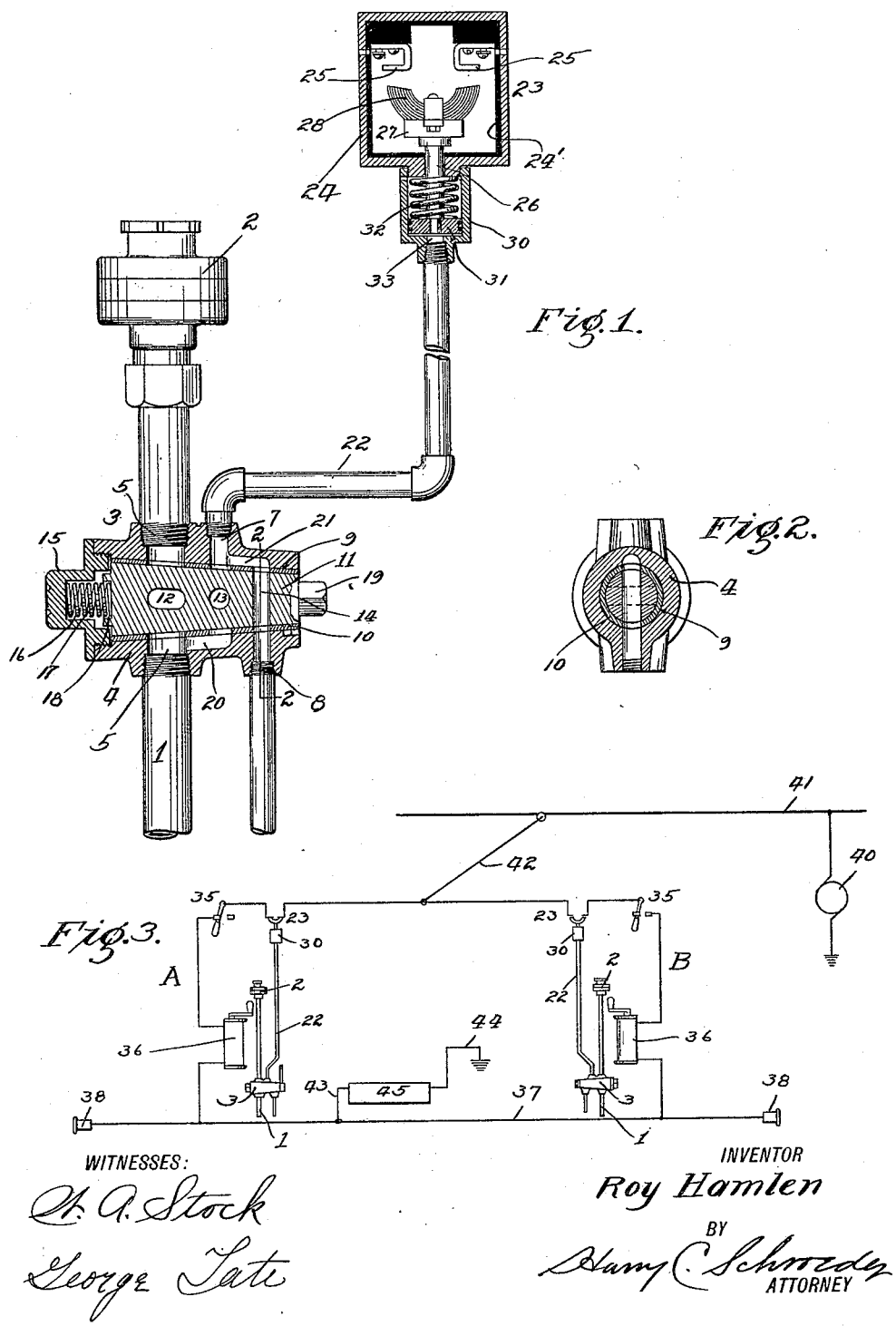
WITNESSES:
H. A. Stock
George Tate
INVENTOR
Roy Hamlen
BY
Harry C. Schroder
ATTORNEY

UNITED STATES PATENT OFFICE.

ROY HAMLEN, OF OAKLAND, CALIFORNIA, ASSIGNOR OF FORTY ONE-HUNDREDTHS TO GEORGE TATE, OF OAKLAND, CALIFORNIA.

SAFETY-SWITCH FOR ELECTRIC TRAIN CONTROLS.

1,138,287.  Specification of Letters Patent.  Patented May 4, 1915.

Application filed March 31, 1914. Serial No. 828,527.

*To all whom it may concern:*

Be it known that I, ROY HAMLEN, a citizen of the United States, residing at Oakland, in the county of Alameda and State of California, have invented certain new and useful Improvements in Safety-Switches for Electric Train Controls, of which the following is a specification.

This invention relates to improvements in automatic safety switches and more particularly to a pressure operated switch as used in connection with the air brake system of trains controllable from both ends. The piping of such systems is so arranged that a cock in the supply pipe leading to the brake operating valve on one end must be closed and that on the other end opened when it is desired to operate from the latter end, and if through any mistake the latter cock is not opened and the train started then the brakes can not be applied.

The object of my automatic safety valve is to provide means for interrupting the current to the controller so that under these conditions the train can not be started until the proper valve is opened. I accomplish this result by inserting in the supply pipe to the brake valve an improved form of cock and placing a special pressure operated switch in the line leading to the controller so that when the cock is positioned to shut off the air supply to the brake valve it releases the pressure operated switch thus opening the electrical circuit.

With these and other objects in view my invention consists in the novel construction and arrangement of parts as herein described and more specifically pointed out in the appended claim.

Reference should be had to the accompanying drawing forming a part of this specification wherein, Figure 1 is a view in elevation showing the brake valve with my improved cock in the pipe leading thereto, the pressure operated switch and the connection therebetween, the improved cock and switch being shown in section and the cock in its "off" position.

Fig. 2 is a view in section on line 2—2 Fig. 1. Fig. 3 is a diagrammatic view of the car showing the piping and wiring system used in connection with my improved switch.

The numeral 1 denotes the supply piping leading from the air reservoir or train line to the brake valve 2 and positioned in this pipe adjacent the latter is my improved cock 3, which consists of an outer casing 4 having diametrically disposed connecting openings 5 for the air supply pipe 1 to the brake valve and connections 7 and 8 for the purpose hereinafter described.

The cock is provided with the usual taper bore 9 in which I provide a renewable liner 10, which may readily be replaced when the interior bore becomes worn. Seated in this liner is a plug 11 having parallel openings 12 and 13 therethrough, the former being adapted to be brought into alinement with the connecting openings 5 and the latter to be brought into alinement with, connecting opening 7. There is also a third opening through the valve denoted by 14, which is disposed at right angles to openings 12 and 13, and this opening is adapted on rotation of the plug to be brought into alinement with connecting opening 8. On the large end of the cock is provided a cap 15 in threaded engagement with the interior of the casing 4 and this cap is provided with a cavity 16 wherein is seated a coil spring 17, the other end of which is seated in a recess 18 in the large end of plug 11. This spring tends to keep the valve tightly seated in the bore of the liner. On the opposite end of the plug is provided a square or hexagonal lug 19 adapted to be engaged by a wrench for the purpose of turning the plug.

From the lower connecting opening 5 is provided a lateral branch 20 to a point diametrically opposite the opening 7 with which it is adapted to be connected by passageway 13, also from the connecting opening 7 is provided a lateral branch 21 to a point diametrically opposite the opening of connection 8 with which it is adapted to be connected by means of passageway 14. From connecting opening 7 a pipe 22 leads to the improved safety switch which is denoted in general by 23. This switch consists in detail of an outer casing 24 provided with an interior fireproof insulating lining 24' and mounted in the upper walls of the casing are two terminal contacts 25. In the bottom of the casing is provided an opening through which extends a piston rod 26 carrying on its upper end a block 27 wherein is mounted a switch blade 28 of any preferred construction, and as illustrated, consists of a number of laminae, the ends of which are adapted to contact against the underside of terminals 25. A boss is provided around the opening through which the piston rod 26 passes and in threaded engagement therewith is a cylinder 30 wherein is slidably mounted a piston 31 attached to the lower end of rod 26, and interposed between the piston and the underside of the boss is a compression spring 32. A connecting opening 33 is provided on the lower side of this cylinder and pipe 22 is in threaded engagement therewith.

In a diagrammatic view A represents the apparatus placed on one end of the train and B the apparatus placed at the other end. The controller switch on each end is denoted by 35 while 36 denotes the controller, and 37 the bus-line having the coupling sockets 38. A source of current 40 supplies the transmission line 41 and 42 is a trolley or other means of making connection therewith. If B represents the non-operating end, then on leaving this end the motorman would open the control switch 35 to the controller of that end and close the valve 3, and on going to the other end he would close the corresponding switch 35 and open valve 3 on that end. The opening of this valve places the control valve 2 in connection with the supply pipe 1 through passage way 12, and also by way of the lateral branch 20 and passageway 13 places pipe 22 in communication with the air supply. The pressure thus supplied to pipe 22 enters cylinder 30 on the under side of the piston 31, raises the latter against spring 32 until the laminated switch blade contacts with terminals 25 thus completing the circuit from the transmission line 41, connecting means 42, switch 23, manually operated switch 25, controller 36 to the bus-line 37, to the electromagnetically operated motor control rheostat 45. Now it will be apparent that if valve 3 is left in its "off" position a passageway will be opened from pipe 22 through the lateral passage 21, passageway 14, connection 8 to the atmosphere, and consequently the piston 31 will be depressed to its lowest position by means of a spring 32 and the switch blades 28 will not make contact between terminals 25 and therefore no current will flow through the controller if an attempt is made to start the train without first placing valve 3 in its "on" position.

It will thus be seen that I have provided a simple and effective means for accomplishing the results described and while I have shown the preferred embodiment of my invention it will be understood that minor changes in detail design may be made without departing from the spirit of my invention.

I claim as new and wish to secure by Letters Patent:—

In a safety switch for train controlling systems comprising in combination a pneumatically operated electrical switch adapted to close the circuit to the controller, a cock in the supply pipe to the brake valve, a connecting pipe from said cock to said pneumatic switch, the plug of said cock having a plurality of passages, two of said passages being adapted to simultaneously admit air to the brake valve and the said pneumatically operated switch, and the third passageway adapted to discharge the pressure from said switch when the said first mentioned passageways are closed.

In testimony whereof I affix my signature in presence of two witnesses.

ROY HAMLEN.

Witnesses:
GEORGE TATE,
W. A. STOCK.